(12) United States Patent
Hoshi et al.

(10) Patent No.: US 6,660,790 B1
(45) Date of Patent: Dec. 9, 2003

(54) STYRENE POLYMER COMPOSITION (75) Inventors: Susumu Hoshi, Yokohama (JP); Nobuaki Kubo, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/069,752

(22) PCT Filed: Jun. 30, 2000

(86) PCT No.: PCT/JP00/04373

§ 371 (c)(1), (2), (4) Date: May 21, 2002

(87) PCT Pub. No.: WO02/02693

PCT Pub. Date: Jan. 10, 2002

(51) Int. Cl.$^7$ .............................. C08L 25/14; C08L 53/02
(52) U.S. Cl. ............................. 524/291; 525/93; 525/98
(58) Field of Search ...................... 525/93, 98; 524/291

(56) References Cited

U.S. PATENT DOCUMENTS 3,639,517 A    2/1972    Kitchen et al.

FOREIGN PATENT DOCUMENTS

| JP | 59-221348 | 12/1984 |
|----|-----------|---------|
| JP | 61-25819  | 2/1986  |
| JP | 5-104630  | 4/1993  |
| JP | 6-220278  | 8/1994  |
| JP | 7-216187  | 8/1995  |
| JP | 8-41281   | 2/1996  |
| JP | 9-151285  | 6/1997  |

*Primary Examiner*—Jeffrey Mullis
(74) *Attorney, Agent, or Firm*—Birch, Stewart, Kolasch & Birch, LLP (57) ABSTRACT

Disclosed is a styrene polymer composition comprising a styrene/n-butyl acrylate copolymer (I) comprising styrene monomer units and n-butyl acrylate monomer units in a specific ratio, and a branched block copolymer (II) comprising vinyl aromatic hydrocarbon monomer units and conjugated diene monomer units in a specific ratio, wherein the branched block copolymer (II) has a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block, wherein the vinyl aromatic hydrocarbon polymer block of the branched block copolymer (II) exhibits, in a gel permeation chromatogram thereof, at least one peak molecular weight in each of two different specific ranges, and wherein the branched block copolymer (II) has a specific vinyl aromatic hydrocarbon block ratio.

7 Claims, 1 Drawing Sheet

FIG.1

STYRENE POLYMER COMPOSITION

This application is the national phase under 35 U.S.C. §371 of PCT International Application No. PCT/JP00/04373 which has an International filing date of Jun. 30, 2000, which designated the United States of America.

BACKGROUND OF THE INVENTION

1. Field of the Invention

The present invention relates to a styrene polymer composition comprising a styrene/n-butyl acrylate copolymer (I) and a branched block copolymer (II) comprising vinyl aromatic hydrocarbon monomer units and conjugated diene monomer units. More particularly, the present invention is concerned with a styrene polymer composition comprising a styrene/n-butyl acrylate copolymer (I) comprising styrene monomer units and n-butyl acrylate monomer units in a specific ratio, and a branched block copolymer (II) comprising vinyl aromatic hydrocarbon monomer units and conjugated diene monomer units in a specific ratio, wherein the branched block copolymer (II) has a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block, wherein the vinyl aromatic hydrocarbon polymer block of the branched block copolymer (II) exhibits, in a gel permeation chromatogram thereof, at least one peak molecular weight in each of two different specific ranges, wherein the branched block copolymer (II) has a specific vinyl aromatic hydrocarbon block ratio, and wherein the weight ratio of the styrene/n-butyl acrylate copolymer (I) to the branched block copolymer (II) is in a specific range.

A shaped article (such as a sheet or a film) obtained from the styrene polymer composition of the present invention not only exhibits high modulus in tension, high elongation at break, high surface impact strength, excellent transparency and excellent heat resistance, but also is free from marked occurrence of fish eyes (hereinafter, a "fish eye" is frequently referred to simply as an "FE"). Further, by incorporating a specific additive into the styrene polymer composition of the present invention, the occurrence of FE's in a shaped article (such as a sheet or a film) obtained therefrom can be more effectively suppressed. In addition, a heat shrinkable sheet obtained from the above-mentioned sheet not only is free from marked occurrence of FE's but also exhibits excellent heat shrinkability at relatively low heating temperatures.

2. Prior Art

A block copolymer comprising vinyl aromatic hydrocarbon monomer units and conjugated diene monomer units wherein the vinyl aromatic hydrocarbon monomer unit content is relatively high, has various excellent characteristics, such as transparency and impact resistance, so that the block copolymer has been used for producing injection-molded products, extrusion-molded products (such as a sheet and a film) and the like. Further, a polymer composition comprising the above-mentioned block copolymer and a vinyl aromatic hydrocarbon/aliphatic unsaturated carboxylic acid derivative copolymer has excellent transparency, mechanical properties and shrinkability, so that the composition has been used for producing a sheet, a film and the like.

Conventionally, with respect to the above-mentioned polymer composition, and a sheet or film obtained therefrom, a number of proposals have been made in patent documents. For example, as a composition having not only high tensile strength, modulus and impact strength, but also excellent optical characteristics, elongation property and cracking resistance and the like, Unexamined Japanese Patent Application Laid-Open Specification No. 59-221348 discloses a polymer composition comprising a vinyl aromatic hydrocarbon/aliphatic unsaturated carboxylic acid derivative copolymer and a copolymer comprising at least one vinyl aromatic hydrocarbon polymer block and at least one polymer block composed mainly of a conjugated diene, wherein the vinyl aromatic hydrocarbon/aliphatic unsaturated carboxylic acid derivative copolymer has an aliphatic unsaturated carboxylic acid derivative content of from 5 to 80% by weight and has a Vicat softening point of 90° C. or less. As a heat shrinkable film having excellent heat shrinkability at relatively low heating temperatures, optical characteristics, cracking resistance, dimensional stability and the like, Unexamined Japanese Patent Application Laid-Open Specification No. 61-25819 discloses a film obtained by stretching a film of a polymer composition comprising a vinyl aromatic hydrocarbon/aliphatic unsaturated carboxylic acid derivative copolymer and a copolymer comprising at least one vinyl aromatic hydrocarbon polymer block and a polymer block composed mainly of a conjugated diene derivative, wherein the vinyl aromatic hydrocarbon/aliphatic unsaturated carboxylic acid derivative copolymer has a vinyl aromatic hydrocarbon content of from 20 to 95% by weight and has a Vicat softening point of 90° C. or less. Further, as a transparent, heat shrinkable film having excellent resistance to deterioration with time and impact resistance, Unexamined Japanese Patent Application Laid-Open Specification No. 5-104630 discloses a rigid, heat shrinkable film of a polymer composition comprising a vinyl aromatic hydrocarbon/aliphatic unsaturated carboxylic acid derivative copolymer and a copolymer comprising at least one vinyl aromatic hydrocarbon polymer block and at least one polymer block composed mainly of a conjugated diene derivative, wherein the vinyl aromatic hydrocarbon/aliphatic unsaturated carboxylic acid derivative copolymer has a Vicat softening point of 105° C. or less. This heat shrinkable film exhibits a heat shrinkability in a specific range, as measured-in a specific direction of the film. Further, as a polymer composition having excellent transparency, stiffness, and surface impact resistance at low temperatures, Unexamined Japanese Patent Application Laid-Open Specification No. 6-220278 discloses a polymer composition comprising a block copolymer comprising a vinyl aromatic hydrocarbon and a conjugated diene and a vinyl aromatic hydrocarbon/(meth)acrylic ester copolymer resin, wherein the block copolymer has a specific block configuration and a specific molecular weight distribution. Moreover, as a resin composition having excellent transparency and impact resistance, Unexamined Japanese Patent Application Laid-Open Specification No. 7-216187 discloses a transparent resin composition having high strength, which comprises a block copolymer and a vinyl aromatic hydrocarbon/(meth)acrylic ester copolymer, wherein the block copolymer comprises two vinyl aromatic hydrocarbon polymer blocks and two vinyl aromatic hydrocarbon/conjugated diene copolymer blocks.

However, each of the conventional polymer compositions described in the above-mentioned patent documents, each of which comprises a block copolymer comprising vinyl aromatic hydrocarbon monomer units and conjugated diene monomer units and a vinyl aromatic hydrocarbon/aliphatic unsaturated carboxylic acid derivative copolymer, has a problem in that, when the conventional composition is used for producing a relatively thin sheet or film, it is impossible to obtain a sheet or film which not only has high modulus-in-tension, high elongation at break, high surface impact strength, excellent transparency and excellent heat resistance, but also is free from marked occurrence of FE's. In addition, the above-mentioned patent documents do not have any description about how to solve the problem.

SUMMARY OF THE INVENTION

In this situation, the present inventors have made extensive and intensive studies with a view toward solving the above-mentioned problem accompanying the prior art, i.e., with a view toward developing a block copolymer composition which can be advantageously used for producing a shaped article (such as a sheet or a film) which not only has high modulus-in-tension, high elongation at break, high surface impact strength, excellent transparency and excellent heat resistance, but also is free from marked occurrence of FE's. As a result, it has unexpectedly been found that a desired composition having the above-mentioned excellent properties can be realized by a styrene polymer composition comprising a styrene/n-butyl acrylate copolymer (I) comprising styrene monomer units and n-butyl acrylate monomer units in a specific ratio, and a branched block copolymer (II) comprising vinyl aromatic hydrocarbon monomer units and conjugated diene monomer units in a specific ratio, wherein branched block copolymer (II) has a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block, wherein the vinyl aromatic hydrocarbon polymer block of the branched block copolymer (II) exhibits, in a gel permeation chromatogram thereof, at least one peak molecular weight in each of two different specific ranges, wherein the branched block copolymer (II) has a specific vinyl aromatic hydrocarbon block ratio, and wherein the weight ratio of the styrene/n-butyl acrylate copolymer (I) to the branched block copolymer (II) is in a specific range. Based on this finding, the present invention has been completed.

Accordingly, it is a primary object of the present invention to provide a styrene polymer composition which can be advantageously used for producing a shaped article (such as a sheet or a film) which not only has high modulus-in-tension, high elongation at break, high surface impact strength, excellent transparency and excellent heat resistance, but also is free from marked occurrence of FE's.

The foregoing and other objects, features and advantages of the present invention will be apparent from the following detailed description and appended claims taken in connection with the accompanying drawing.

BRIEF DESCRIPTION OF THE DRAWING

In FIG. 1, a curve drawn by solid line shows the lower limit of the preferred range of the melt viscosity, wherein the lower limit is defined by the following formula:

Lower limit of the melt viscosity=$1.46 \times 10^5 - 1119.2 \times T + 2.256 \times T^2$ wherein T represents the measuring temperature (°C.) for the melt viscosity, and a curve drawn by broken line shows the upper limit of the preferred range of the melt viscosity, wherein the upper limit is defined by the following formula:

Upper limit of the melt viscosity=$2.91 \times 10^5 - 2350 \times T + 5 \times T^2$ wherein T represents the measuring temperature (°C.) for the melt viscosity.

DETAILED DESCRIPTION OF THE INVENTION

According to the present invention, there is provided a styrene polymer composition comprising:

(I) a styrene/n-butyl acrylate copolymer comprising 80 to 89% by weight of styrene monomer units and 20 to 11% by weight of n-butyl acrylate monomer units; and (II) a branched block copolymer comprising 65 to 85% by weight of vinyl aromatic hydrocarbon monomer units and 35 to 15% by weight of conjugated diene monomer units, the branched block copolymer (II) having a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block, wherein the at least one vinyl aromatic hydrocarbon polymer block of the branched block copolymer (II) exhibits, in a gel permeation chromatogram thereof, at least one peak molecular weight in the range of from 5,000 to 30,000 and at least one peak molecular weight in the range of from 50,000 to 150,000, wherein the branched block copolymer (II) has a vinyl aromatic hydrocarbon block ratio of from more than 90 to 100% by weight, wherein the vinyl aromatic hydrocarbon block ratio is defined as the percent by weight of the vinyl aromatic hydrocarbon monomer units contained in the at least one vinyl aromatic hydrocarbon polymer block, based on the total weight of vinyl aromatic hydrocarbon monomer units contained in the branched block copolymer (II), and wherein the weight ratio of the styrene/n-butyl acrylate copolymer (I) to the branched block copolymer (II) is from 10/90 to 90/10.

For easy understanding of the present invention, the essential features and various preferred embodiments of the present invention are enumerated below.

1. A styrene polymer composition comprising:

(I) a styrene/n-butyl acrylate copolymer comprising 80 to 89% by weight of styrene monomer units and 20 to 11% by weight of n-butyl acrylate monomer units; and (II) a branched block copolymer comprising 65 to 85% by weight of vinyl aromatic hydrocarbon monomer units and 35 to 15% by weight of conjugated diene monomer units, the branched block copolymer (II) having a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block, wherein the at least one vinyl aromatic hydrocarbon polymer block of the branched block copolymer (II)

exhibits, in a gel permeation chromatogram thereof, at least one peak molecular weight in the range of from 5,000 to 30,000 and at least one peak molecular weight in the range of from 50,000 to 150,000, wherein the branched block copolymer (II) has a vinyl aromatic hydrocarbon block ratio of from more than 90 to 100% by weight, wherein the vinyl aromatic hydrocarbon block ratio is defined as the percent by weight of the vinyl aromatic hydrocarbon monomer units contained in the at least one vinyl aromatic hydrocarbon polymer-block, based on the total weight of vinyl aromatic hydrocarbon monomer units contained in the branched block copolymer (II), and wherein the weight ratio of the styrene/n-butyl acrylate copolymer (I) to the branched block copolymer (II) is from 10/90 to 90/10.

2. The styrene polymer composition according to item 1 above, wherein the styrene/n-butyl acrylate copolymer (I) comprises 83 to 89% by weight of styrene monomer units and 17 to 11% by weight of n-butyl acrylate monomer units.

3. The styrene polymer composition according to item 1 or 2 above, wherein the conjugated diene monomer units in the branched block copolymer (II) are formed from at least one conjugated diene selected from the group consisting of 1,3-butadiene and isoprene.

4. The styrene polymer composition according to any one of items 1 to 3 above, wherein the aliphatic double bonds of the conjugated diene monomer units in the branched block copolymer (II) are partially hydrogenated, wherein the degree of hydrogenation of the aliphatic double bonds is from 1 to 50%.

5. The styrene polymer composition according to any one of items 1 to 4 above, wherein the styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq$$
$$P(T) \leq 2.91 \times 10^5 - 2350 \times T + 5 \times T^2$$

wherein T represents the measuring temperature (°C.) for the melt viscosity and P(T) represents the melt viscoses) of the copolymer (I) as measured at temperature T (°C.).

6. The styrene polymer composition according to any one of items 1 to 5 above, wherein the styrene/n-butyl acrylate copolymer (I) exhibits a storage modulus in the range of from $1.5 \times 10^9$ to $2.5 \times 10^9$ Pa as measured at 30° C., and wherein the temperature at which the copolymer (I) exhibits a 50% storage modulus relative to the storage modulus at 30° C. is in the range of from 75 to 100° C.

7. The styrene polymer composition according to any one of items 1 to 6 above, which further comprises, as a stabilizer, 0.05 to 3 parts by weight of 2-(1-(2-hydroxy-3,5-di-t-pentylphenyl)ethyl)-4,6-di-t-pentylphenyl acrylate, relative to 100 parts by weight of the total of the styrene/n-butyl acrylate copolymer (I) and the branched block copolymer (II).

Hereinbelow, the present invention is described in detail.

In the present invention, the monomer units of the polymer are named in accordance with a nomenclature wherein the names of the original monomers from which the monomer units are derived are used with the term "unit" attached thereto. For example, the term "vinyl aromatic monomer unit" means a monomer unit which is formed in a polymer obtained by the polymerization of the vinyl aromatic monomer. The vinyl aromatic monomer unit has a molecular structure wherein the two carbon atoms of a substituted ethylene group derived from a substituted vinyl group respectively form linkages to adjacent vinyl aromatic monomer units. Similarly, the term "conjugated diene monomer unit" means a monomer unit which is formed in a polymer obtained by the polymerization of the conjugated diene monomer. The conjugated diene monomer unit has a molecular structure wherein two carbon atoms of an olefin derived from a conjugated diene monomer respectively form linkages to adjacent conjugated diene monomer units.

The styrene polymer composition of the present invention comprises (I) a styrene/n-butyl acrylate copolymer and a (II) branched block copolymer.

The styrene/n-butyl acrylate copolymer (I) used in the present invention comprises 80 to 89% by weight of styrene monomer units and 20 to 11% by weight of n-butyl acrylate monomer units. It is preferred that the styrene monomer unit content of the styrene/n-butyl acrylate copolymer (I) is from 83 to 89% by weight. When the styrene monomer unit content of the styrene/n-butyl acrylate copolymer (I) is less than 80% by weight or more than 89% by weight, the transparency of a shaped article produced from the styrene polymer composition becomes disadvantageously poor.

It is preferred that the styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \leq$$
$$P(T) \leq 2.91 \times 10^5 - 2350 \times T + 5 \times T^2$$

wherein T represents the measuring temperature (°C.) for the melt viscosity and P(T) represents the melt viscosity (poises) of the copolymer (I) as measured at temperature T (°C.).

Figure 1:
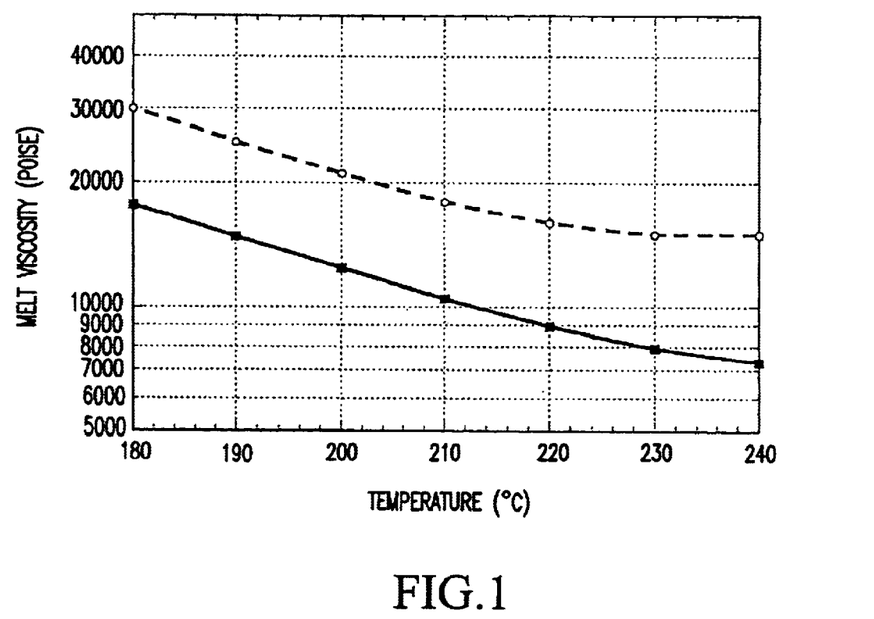
FIG. 1 shows a graph for explaining a preferred range of the melt viscosity of the styrene/n-butyl acrylate copolymer (I) used in the present invention, as measured at a temperature in the range of from 180 to 240° C.

FIG. 1 is a graph for explaining a preferred range of the melt viscosity P(T) of the styrene/n-butyl acrylate copolymer (I) used in the present invention, as measured at a temperature in the range of from 180 to 240° C. In FIG. 1, a curve drawn by solid line shows the lower limit of the above-mentioned preferred range of the melt viscosity, wherein the lower limit is defined by the following formula:

Lower limit of the melt viscosity=$1.46 \times 10^5 - 1119.2 \times T + 2.256 \times T^2$ wherein T represents the measuring temperature (°C.) for the melt viscosity, and a curve drawn by broken line shows the upper limit of the above-mentioned preferred range of the melt viscosity, wherein the upper limit is defined by the following formula:

Upper limit of the melt viscosity=$2.91 \times 10^5 - 2350 \times T + 5 \times T^2$ wherein T represents the measuring temperature (°C.) for the melt viscosity.

When the melt viscosity P(T) is higher than the upper limit defined by the above-mentioned formula, it is likely that a sheet produced from the styrene polymer composition suffers occurrence of relatively small FE's. When the melt viscosity P(T) is lower than the lower limit defined by the above-mentioned formula, it is likely that a sheet produced from the styrene polymer composition suffers occurrence of relatively large FE's.

In the present invention, the melt viscosity P(T) of the styrene/n-butyl acrylate copolymer (I) at a temperature in the range of from 180 to 240° C. is measured using a capirograph (manufactured and sold by Toyo Seiki Co., Ltd., Japan) under conditions wherein the shear rate (SR) is 61 sec$^{-1}$, the capillary length (L) is 10.0 mm, the capillary diameter (D) is 1.00 mm and the barrel diameter (B) is 9.50 mm.

With respect to the storage modulus of the styrene/n-butyl acrylate copolymer (I), it is preferred that the storage modulus as measured at 30° C. is in the range of from $1.5 \times 10^9$ to $2.5 \times 10^9$ Pa, and that the temperature at which the copolymer (I) exhibits a 50% storage modulus relative to the storage modulus at 30° C. is in the range of from 75 to 100° C. It is more preferred that the storage modulus as measured at 30° C. is in the range of from $1.7 \times 10^9$ to $2.3 \times 10^9$ Pa, and that the temperature at which the copolymer (I) exhibits a 50% storage modulus relative to the storage modulus at 30° C. is in the range of from 77 to 95° C.

When the storage modulus of the styrene/n-butyl acrylate copolymer (I) as measured at 30° C. is lower than $1.5 \times 10^9$ Pa, it is likely that the stiffness of a shaped article (e.g., a sheet) produced from the styrene polymer composition is not satisfactorily improved. On the other hand, when the storage modulus of the styrene/n-butyl acrylate copolymer (I) as measured at 30° C. is higher than $2.5 \times 10^9$ Pa, it is likely that the elongation at break of a shaped article (e.g., a sheet) produced from the styrene polymer composition is not satisfactorily improved. Further, when the temperature at which the copolymer (I) exhibits a 50% storage modulus relative to the storage modulus at 30° C. is less than 75° C., it is likely that the heat resistance of a shaped article (e.g., a sheet) produced from the styrene polymer composition is not satisfactorily improved. On the other hand, when the temperature at which the copolymer (I) exhibits a 50% storage modulus relative to the storage modulus at 30° C. is higher than 100° C., it is likely that a heat shrinkable film produced from the styrene polymer composition is not satisfactorily improved with respect to the heat shrinkability at relatively low heating temperatures.

In the present invention, the storage modulus of the styrene/n-butyl acrylate copolymer (I) is measured using DMA983 (manufactured and sold by DUPONT, U.S.A.) under conditions wherein the frequency is the resonant frequency and the rate of temperature elevation is 2° C./min.

In the present invention, the melt viscosity P(T) of the styrene/n-butyl acrylate copolymer (I) at a temperature in the range of from 180 to 240° C., the storage modulus of the copolymer (I) as measured at 30° C., and the temperature at which the copolymer (I) exhibits a 50% storage modulus relative to the storage modulus at 30° C. can be controlled by appropriately adjusting various conditions in the below-described polymerization method for producing the copolymer (I), such as the amounts of styrene, n-butyl acrylate and a molecular weight modifier, the residence time of the raw materials in the polymerizer used for the polymerization, and the polymerization temperature.

The styrene/n-butyl acrylate copolymer (I) used in the present invention can be produced by conventional methods, such as a bulk polymerization, a solution polymerization, a suspension polymerization and an emulsion polymerization.

From the viewpoint of improving processability of the styrene/n-butyl acrylate copolymer (I), the melt flow rate (hereinafter, frequently referred to as "MFR") of the copolymer (I) is preferably from 0.1 to 20 g/10 min, more preferably from 1 to 10 g/10 min, as measured in accordance with JISK-6870 under conditions "G" prescribed therein (temperature: 200° C., load: 5 kg).

The branched block copolymer (II) used in the present invention comprises 65 to 85% by weight of vinyl aromatic hydrocarbon monomer units and 35 to 15% by weight of conjugated diene monomer units. It is preferred that the branched block copolymer (II) comprises 70 to 80% by weight of vinyl aromatic hydrocarbon monomer units and 30 to 20% by weight of conjugated diene monomer units.

When the branched block copolymer (II) comprises less than 65% by weight of vinyl aromatic hydrocarbon monomer units and more than 35% by weight of conjugated diene monomer units, a shaped article produced from the styrene polymer composition suffers marked occurrence of FE's. On the other hand, when the branched block copolymer (II) comprises more than 85% by weight of vinyl aromatic hydrocarbon monomer units and less than 15% by weight of conjugated diene monomer units, the elongation at break of a shaped article (e.g., a sheet) produced from the styrene polymer composition becomes disadvantageously low.

The branched block copolymer (II) used in the present invention has a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block.

In the present invention, the term "branched block copolymer" means a block copolymer having a structure in which a plurality of polymer chains are bonded together by a coupling agent having a functionality of from 3 to 8, so that the polymer chains extend from the residue of the coupling agent.

The polymer chains forming the branched block copolymer (II) are generally selected from the following three types of polymer chains (1), (2) and (3):

(1) a polymer chain comprising at least one vinyl aromatic hydrocarbon polymer block and at least one conjugated diene polymer block:

(2) a polymer chain comprising at least one vinyl aromatic hydrocarbon polymer block, at least one conjugated diene polymer block, and at least one vinyl aromatic hydrocarbon/conjugated diene copolymer block; and (3) a polymer chain comprising at least one vinyl aromatic hydrocarbon polymer block and at least one vinyl aromatic hydrocarbon/conjugated diene copolymer block.

As examples of polymer chains of types (1), (2) and (3) above, there can be mentioned polymer chains having block configurations represented by the following formulae, respectively:

wherein each S independently represents a vinyl aromatic hydrocarbon polymer block, each B independently represents a conjugated diene polymer block, each B/S independently represents a vinyl aromatic hydrocarbon/conjugated diene copolymer block, and each n independently represents a natural number of from 1 to 5.

The above-mentioned polymer chains of types (1), (2) and (3) can be produced in a hydrocarbon solvent in the presence of an organolithium compound as a polymerization initiator.

The branched block copolymer (II) used in the present invention can be produced, for example, by coupling together a plurality of polymer chains selected from the above-mentioned polymer chains of types (1), (2) and (3) above using a coupling agent having a functionality of from 3 to 8, wherein two or more different polymer chains belonging to the same type may be used.

Examples of coupling agents having a functionality of from 3 to 8 include silicon tetrachloride, tin tetrachloride, epoxidized soybean oil, tetraglycidyl-1,3-bisaminomethylcyclohexane, a hydrocarbon poly-halide, a carboxylic ester and a polyvinyl compound.

Examples of block configurations of the branched block copolymer (II) include those which are represented by the following formulae:

wherein each S with suffix independently represents a vinyl aromatic hydrocarbon polymer block, in which the suffix represents the block identification number of the vinyl aromatic hydrocarbon polymer block, each B independently represents a conjugated diene polymer block, each B/S independently represents a vinyl aromatic hydrocarbon/conjugated diene copolymer block, each X independently represents a residue of a coupling agent having a functionality of from 3 to 8, such as silicon tetrachloride, tin tetrachloride, epoxidized soybean oil, tetraglycidyl-1,3-bisaminomethylcyclohexane, a hydrocarbon polyhalide, a carboxylic ester or a polyvinyl compound, each n independently represents a natural number of from 1 to 5, and each m and each k independently represents a natural number such that m+k in a block configuration is from 3 to 8.

When the branched block copolymer (II) is produced by the above-mentioned method, the reaction conditions are as follows. With respect to the polymerization reactions for producing the polymer chains (used for forming the branched block copolymer (II)) and the coupling reaction for coupling the polymer chains using a coupling agent having a multifunctionality, the temperature employed for each of the polymerization reactions and the coupling reaction is generally from −10 to 150° C., preferably from 40 to 120° C. The polymerization reaction time varies depending on other reaction conditions; however, the polymerization reaction time is generally 10 hours or less, preferably from 0.5 to 5 hours. The coupling reaction time is generally from 1 to 60 minutes. It is preferred that the polymerization reaction is performed in an atmosphere of an inert gas, such as nitrogen gas. With respect to the polymerization reaction pressure, there is no particular limitation so long as the pressure is sufficient to maintain the monomers and the solvent in a liquid state at a temperature within the above-mentioned range of polymerization reaction temperature. Further, care must be taken so as to prevent impurities (such as water, oxygen and carbon dioxide gas), which are likely to deactivate not only the polymerization catalyst but also a living polymer being formed, from intruding into the polymerization reaction system.

In the present invention, it is preferred that the branched block copolymer (II) has a polymodal molecular weight distribution. The branched block copolymer having a "polymodal molecular weight distribution" means a branched block copolymer which exhibits a plurality of peaks or modes (i.e., small rises which, in general, are not called "peaks") in a molecular weight distribution curve (i.e., gel permeation chromatogram) obtained by subjecting the branched block copolymer to gel permeation chromatography (hereinafter, frequently referred to as "GPC"). Such a branched block copolymer is described, for example, in Examined Japanese Patent Application Publication No. 48-4106 (corresponding to U.S. Pat. No. 3,639,517).

In the present invention, it is required that the vinyl aromatic hydrocarbon polymer block of the branched block copolymer (II) exhibit, in a gel permeation chromatogram (GPC chromatogram) thereof, at least one peak molecular weight in the range of from 5,000 to 30,000 and at least one peak molecular weight in the range of from 50,000 to 150,000. It is preferred that the vinyl aromatic hydrocarbon polymer block of the copolymer (II) exhibits, in a gel permeation chromatogram thereof, at least one peak molecular weight in the range of from 10,000 to 25,000 and at least one peak molecular weight in the range of from 60,000 to 130,000.

When the vinyl aromatic hydrocarbon polymer block of the branched block copolymer (II) does not satisfy the above-mentioned requirement on the peak molecular weights thereof, a shaped article produced from the styrene polymer composition suffers disadvantages, such as the lowering of impact resistance and the lowering of transparency. The peak molecular weights of the vinyl aromatic hydrocarbon polymer block can be controlled by appropriately adjusting the amounts of a catalyst and vinyl aromatic hydrocarbon monomers, which are used for forming the vinyl aromatic hydrocarbon polymer block.

The measurement of the peak molecular weights of the vinyl aromatic hydrocarbon polymer block(s) of the branched block copolymer (II) can be conducted by the following method. First, the branched block copolymer (II) is subjected to oxidative degradation using t-butyl hydroperoxide in the presence of osmium tetraoxide as a catalyst, to thereby separate the vinyl aromatic hydrocarbon polymer blocks from the branched block copolymer (II), following by recovering the resultant vinyl aromatic hydrocarbon polymer components (except for those which have an average degree of polymerization of about 30 or less) (see I. M. Kolthoff et al., J. Polym. Sci. vol. 1, p. 429, 1946). The obtained vinyl aromatic hydrocarbon polymer components are subjected to GPC to thereby obtain a GPC chromatogram. Then, using a calibration curve obtained from GPC chromatograms showing the peak molecular weights of standard monodisperse polystyrene samples, the peak molecular weights of the vinyl aromatic hydrocarbon polymer block components is determined by any of conventional methods (see, for example, Gel Permeation Chromatography, 1976, published by Maruzen Co., Ltd., Japan).

Examples of hydrocarbon solvents used for producing the branched block copolymer (II) include aliphatic hydrocarbons, such as butane, pentane, hexane, isopentane, heptane, octane and isooctane; alicyclic hydrocarbons, such as cyclopentane, methylcyclopentane, cyclohexane, methylcyclohexane and ethylcyclohexane; and aromatic hydrocarbons, such as benzene, toluene, ethylbenzene and xylene. These hydrocarbon solvents can be used individually or in combination.

Examples of vinyl aromatic monomer units used in the branched block copolymer (II) include a styrene monomer unit, an o-methylstyrene monomer unit, a p-methylstyrene monomer unit, a p-tert-butylstyrene monomer unit, a 2,4-dimethylstyrene monomer unit, an α-methylstyrene monomer unit, a vinylnaphthalene monomer unit, a vinylanthracene monomer unit, and a 1,1-diphenylethylene monomer unit. Of these, a styrene monomer unit is especially preferred. These vinyl aromatic monomer units can be used individually or in combination.

Examples of conjugated diene monomer units used in the branched block copolymer (II) include a 1,3-butadiene monomer unit, a 2-methyl-1,3-butadiene (isoprene) monomer unit, a 2,3-dimethyl-1,3-butadiene monomer unit, a 1,3-pentadiene monomer unit and a 1,3-hexadiene monomer unit. These conjugated diene monomer units can be used individually or in combination. Of these, a 1,3-butadiene monomer unit and an isoprene monomer unit are especially preferred.

From the viewpoint of effectively suppressing occurrence of FE's in a shaped article produced from the styrene polymer composition, it is preferred that at least a part of the conjugated diene monomer units in the branched block copolymer (II) are isoprene monomer units. In this case, the branched block copolymer (II) may contain, as the conjugated diene polymer block, only an isoprene homopolymer block, or a combination of an isoprene homopolymer block and a 1,3-butadiene homopolymer block, or only an isoprene/1,3-butadiene copolymer block.

Further, from the viewpoint of effectively suppressing occurrence of FE's in a shaped article produced from the styrene polymer composition, it is also preferred that the aliphatic double bonds of the conjugated diene monomer units in the branched block copolymer (II) are partially hydrogenated, wherein the degree of hydrogenation of the aliphatic double bonds is from 1 to 50%, more advantageously from 3 to 40%, most advantageously from 5 to 30%.

In the present invention, the "degree of hydrogenation" of the double bonds of the conjugated diene monomer units in the branched block copolymer (II) means the percentage (%) of the aliphatic double bonds of the conjugated diene monomer units in the branched block copolymer (II), which have been hydrogenated and converted to saturated hydrocarbon bonds, based on the total number of aliphatic double bonds of the conjugated diene monomer units in the branched block copolymer (II) before the hydrogenation.

The degree of hydrogenation can be measured by means of an infrared (IR) spectrophotometer, a nuclear magnetic resonance (NMR) apparatus or the like.

As examples of catalysts used for the hydrogenation of the branched block copolymer (II), there can be mentioned heterogeneous catalysts and homogeneous catalysts.

Specific examples of heterogeneous catalysts include a carrier-supported catalyst comprising a metal (such as Ni, Pt, Pd or Ru) supported on a carrier (such as carbon, silica, alumina or diatomaceous earth).

Specific examples of homogeneous catalysts include the so-called Ziegler type catalysts, such as a catalyst comprising an transition metal salt (such as an organic acid salt or acetylaceton salt of Ni, Co, Fe or Cr) and a reducing agent (such as an organoaluminum compound): the so-called organometal complex catalysts, such as an organometal compound containing Ru, Rh or the like; and catalysts comprising a titanocene compound and a reducing agent (such as an organolithium compound, an organoaluminum compound or an organomagnesium compound).

As specific examples of the method for partially hydrogenating the aliphatic double bonds of the conjugated diene monomer units in the branched block copolymer (II), there can be mentioned methods described in Examined Japanese Patent Application Publication No. 42-8704 (corresponding to AU 6453173, CA 815575 and DE 1222260), Examined Japanese Patent Application Publication No. 43-6636 (corresponding to U.S. Pat. No. 3,333,024), Examined Japanese Patent Application Publication No. 63-4841 (corresponding to U.S. Pat. No. 4,501,857) and Examined Japanese Patent Application Publication No. 63-5401 (corresponding to U.S. Pat. No. 4,501,857), in each of which the hydrogenation is performed in an inert solvent in the presence of a hydrogenation catalyst. Of the methods described in the above-mentioned patent documents, those which are described in Examined Japanese Patent Application Publication Nos. 63-4841 and 63-5401 are preferred.

As described above, the branched block copolymer (II) has a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block.

The branched block copolymer (II) has a vinyl aromatic hydrocarbon block ratio of from more than 90 to 100% by weight, wherein the vinyl aromatic hydrocarbon block ratio is defined as the percent by weight of the vinyl aromatic hydrocarbon monomer units contained in the vinyl aromatic hydrocarbon polymer block(s), based on the total weight of vinyl aromatic hydrocarbon monomer units contained in the branched block copolymer (II). It is preferred that the vinyl aromatic hydrocarbon block ratio is from 92 to 100% by weight.

When the vinyl aromatic hydrocarbon block ratio is 90% by weight or less, the heat resistance of a shaped article produced from the styrene polymer composition becomes disadvantageously low.

In the present invention, the vinyl aromatic hydrocarbon block ratio of the branched block copolymer (II) is measured by the following method. The weight of the vinyl aromatic hydrocarbon polymer components obtained in the above-mentioned measurement of the peak molecular weights of the vinyl aromatic hydrocarbon polymer block(s) of the branched block copolymer (II) is determined. Using the determined weight of the vinyl aromatic hydrocarbon polymer components, the vinyl aromatic hydrocarbon block ratio of the branched block copolymer (II) is calculated by the following formula:

Vinyl aromatic hydrocarbon block ratio of the branched block copolymer (II) (% by weight)=(The weight of the vinyl aromatic hydrocarbon polymer components/the total weight of vinyl aromatic hydrocarbon monomer units contained in the branched block copolymer (II))×100.

The vinyl aromatic hydrocarbon block ratio of the branched block copolymer (II) can be controlled by appropriately adjusting various conditions employed for forming the vinyl aromatic hydrocarbon/conjugated diene copolymer block, such as the amounts of vinyl aromatic hydrocarbon monomers and conjugated diene monomers, and the relationship between polymerization reactivities of the monomers. Illustratively stated, the vinyl aromatic hydrocarbon block ratio can be controlled, for example, by a method in which vinyl aromatic hydrocarbon monomers and conjugated diene monomers are copolymerized while continuously adding a mixture thereof to the polymerization reaction system, or by a method in which vinyl aromatic hydrocarbon monomers and conjugated diene monomers are subjected to copolymerization in the presence of a polar compound or a randomizing agent. These methods can be employed individually or in combination.

Examples of polar compounds and randomizing agents include ethers, such as tetrahydrofuran, diethylene glycol dimethyl ether and diethylene glycol dibutyl ether: amines, such as triethylamine and tetramethylethylenediamine; thio-ethers; phosphines; phosphoramides; alkylbenzene-sulfonates; and potassium and sodium alkoxides.

The branched block copolymer (II) used in the present invention generally has a number average molecular weight of from 10,000 and 500,000. The number average molecular weight of the branched block copolymer (II) can be measured by GPC using a calibration curve obtained with respect to standard monodisperse polystyrene samples.

From the viewpoint of improving processability of the styrene polymer composition, the MFR of the branched block copolymer (II) is preferably from 0.1 to 50 g/10 min, more preferably from 1 to 20 g/10 min.

In the styrene polymer composition of the present invention, the weight ratio of the styrene/n-butyl acrylate copolymer (I) to the branched block copolymer (II) is from 10/90 to 90/10, preferably from 20/80 to 80/20.

When the amount of the styrene/n-butyl acrylate copolymer (I) is more than 90% by weight, based on the total weight of the styrene/n-butyl acrylate copolymer (I) and the branched block copolymer (II), the impact resistance of a shaped article produced from the styrene polymer composition becomes disadvantageously low. On the other hand, when the amount of the styrene/n-butyl acrylate copolymer (I) is less than 10% by weight, the stiffness of a shaped article produced from the styrene polymer composition becomes disadvantageously low.

As mentioned above, a shaped article produced from the styrene polymer composition of the present invention is free from marked occurrence of fish eyes (FE's). Further, the occurrence of FE's in the shaped article can be more effectively suppressed by incorporating 2-(1-(2-hydroxy-3,5-di-t-pentylphenyl)ethyl)-4,6-di-t-pentylphenyl acrylate as a stabilizer into the styrene polymer composition. The amount of the stabilizer is from 0.05 to 3 parts by weight, preferably from 0.1 to 2 parts by weight, relative to 100 parts by weight of the total of the styrene/n-butyl acrylate copolymer (I) and the branched block copolymer (II). When the amount of the stabilizer is less than 0.05 part by weight, it is impossible to satisfactorily suppress the occurrence of FE's. On the other hand, when the stabilizer is added to the styrene polymer composition in an amount exceeding 3 parts by weight, the effect of suppressing the occurrence of FE's cannot be improved, as compared to the case where the stabilizer is added to the styrene polymer composition in an amount of from 0.05 to 3 parts by weight.

The styrene polymer composition of the present invention may further contain at least one phenolic stabilizer in an amount of from 0.05 to 3 parts by weight, relative to 100 parts by weight of the total of the styrene/n-butyl acrylate copolymer (I) and the branched block copolymer (II). Further, the styrene polymer composition of the present invention may further contain at least one organic phosphate- or organic phosphite-type stabilizer in an amount of from 0.05 to 3 parts by weight, relative to 100 parts by weight of the total of the styrene/n-butyl acrylate copolymer (I) and the branched block copolymer (II).

Examples of phenolic stabilizers include n-octadecyl-3-(3,5-di-t-butyl-4-hydroxyphenyl)propionate, 2-t-butyl-6-(3-t-butyl-2-hydroxy-5-methylbenzyl)-4-methylphenyl acrylate, 2,4-bis((octylthio)methyl)-o-cresol, tetrakis (methylene-3-(3,5-di-t-butyl-4-hydroxyphenyl)propionate) methane, 1,3,5-trimethyl-2,4,6-tris(3,5-di-t-butyl-4-hydroxybenzyl)benzene, and 2,4-bis(n-octylthio)-6-(4-hydroxy-3,5-di-t-butylanilino)-1,3,5-triazine.

Examples of organic phosphate- and organic phosphite-type stabilizers include tris(nonylphenyl)-phosphite, 2,2-methylenebis(4,6-di-t-butylphenyl)-octylphosphite, 2-((2,4,8,10-tetrakis(1,1-dimethylethyl)dibenzo(d,f)(1,3,2)-dioxaphosphepin-6-yl)oxy)-N,N-bis(2-((2,4,8,10-tetrakis(1,1-dimethylethyl)dibenzo(d,f)(1,3,2)-dioxaphosphepin-6-yl)oxy)ethyl)ethaneamine, and tris(2,4-di-t-butylphenyl) phosphite.

The styrene polymer composition of the present invention can be produced by any conventional method. Examples of such conventional methods include a melt-kneading method using a mixer generally used in the art, such as an open roll, an intensive mixer, an internal mixer, Ko-kneader, a continuous kneader having a twin-rotor, or an extruder, and a method in which each component is dissolved or dispersed in a solvent, followed by removal of the solvent by heating.

If desired, an additive can be added to the styrene polymer composition of the present invention. Examples of additives include polymeric additives, such as a vinyl aromatic hydrocarbon/conjugated diene block copolymer elastomer in which the vinyl aromatic hydrocarbon monomer unit content is 50% by weight or less, a rubber-modified styrene polymer, a non-rubber-modified styrene polymer and polyethylene terephthalate.

Further examples of additives include those which have conventionally been used as additives for plastics. Examples of such additives include inorganic reinforcing agents, such as glass fiber, glass bead, silica, calcium carbonate and talc; organic reinforcing agents, such as an organic fiber, a coumaroneindene resin; crosslinking agents, such as an organic peroxide and an inorganic peroxide; pigments, such as titanium white, carbon black and iron oxide: dyes; flame retardants; antioxidants; ultraviolet light absorbers; antistatic agents; lubricants; plasticizers; fillers other than mentioned above; and mixtures thereof.

Each of the styrene polymer composition of the present invention per se and a mixture thereof with a coloring agent can be molded by the same molding method as employed in the molding of an ordinary thermoplastic resin to obtain shaped articles for use in various application fields. For example, the molding can be conducted by injection molding or blow molding to obtain a container for parts of office automation apparatuses, daily commodities, food, miscellaneous goods, parts of light electric appliances and the like. Especially, the styrene polymer composition of the present invention can be advantageously used for producing a thin film for use in production of a laminate film, and a heat shrinkable film.

Best Mode for Carrying out the Invention

Hereinbelow, the present invention will be described in more detail with reference to the following Examples and Comparative Examples, which should not be construed as limiting the scope of the present invention.

Properties of the copolymers used in the Examples and Comparative Examples were measured by the following methods.

(1) Melt Viscosity:

The melt viscosity of a copolymer is measured using a capirograph (manufactured and sold by Toyo Seiki Co., Ltd., Japan) under conditions wherein the shear rate (SR) is 61 sec$^{-1}$, the capillary length (L) is 10.0 mm, the capillary diameter (D) is 1.00 mm and the barrel diameter (B) is 9.50 mm. The measurement is conducted while elevating the temperature of the copolymer and at points in time when the temperature reaches 180, 190, 200, 210, 220, 230 and 240° C.

(2) Storage Modulus:

The storage modulus of a copolymer is measured as follows. The copolymer is subjected to compression molding to obtain a test specimen having a thickness of about 3 mm and a width of about 12 mm. The obtained test specimen is fixed to two arms, wherein the distance (span) between the two arms is about 15 mm. Then, the storage modulus of the copolymer is measured with respect to the test specimen using DMA983 (manufactured and sold by DUPONT, U.S.A.) under conditions wherein the frequency is the resonant frequency, the rate of temperature elevation is 2° C./min, and the amplitude is 0.2 mm.

(3) MFR:

MFR is measured in accordance with JISK-6870 under conditions "G" prescribed therein (temperature: 200° C., load: 5 kg).

(4) Degree of Hydrogenation:

The degree of hydrogenation of a copolymer is measured using a nuclear magnetic resonance (NMR) apparatus (DPX-400, manufactured and sold by BRUCKER, Germany).

Properties of the sheets and the heat shrinkable films, which were obtained in the Examples and Comparative Examples, were measured and evaluated by the following methods.

(1) Modulus in tension (index for stiffness) and elongation at break:

With respect to a test specimen in the form of a sheet having a width of 12.7 mm, which is produced by extruding a polymer composition, the measurement is conducted at a pulling rate of 5 mm/min with respect to each of an extrusion direction of the sample and a direction perpendicular to the extrusion direction, wherein the distance between the gage marks is 50 mm. (2) Surface impact strength (index for impact resistance):

The measurement is conducted at 23° C. in accordance with ASTMD-1709, except that the diameter of the weight is ½ inch, to obtain a 50% breakage value.

(3) Haze:

The surface of a sheet is coated with liquid paraffin and, then, the haze of the sheet is measured in accordance with ASTM D1003.

(4) Vicat softening point (index for heat resistance):

7 to 8 sheets having a thickness of 0.6 mm are put one upon another to thereby obtain a laminate, and the obtained laminate is subjected to compression molding to obtain a test specimen having a thickness of 3 mm. With respect to the obtained test specimen, the Vicat softening point is measured in accordance with ASTM D-1525 under a load of 1 kg at a temperature elevation rate of 2° C./min.

(5) 80° C. shrinkage factor (index for heat shrinkability at relatively low heating temperatures):

A 0.25 mm-thick sheet (obtained by extruding a polymer composition) is uniaxially stretched 5-fold in a direction perpendicular to an extrusion direction of the sheet by the use of a tenter, to thereby obtain a heat shrinkable film having a thickness of about 60 μm. The obtained heat shrinkable film is immersed in hot water having a temperature of 80° C. for 5 minutes. The 80° C. shrinkage factor of the heat shrinkable film is calculated by the following formula:

$$80° \text{ C. shrinkage factor } (\%) = \{(L-L_1)/L\} \times 100$$

wherein L represents the length of the heat shrinkable film before the immersion thereof in the hot water having a temperature of 80° C., and $L_1$ represents the length of the heat shrinkable film after 5 minutes of the immersion thereof in the hot water.

(6) Fish eye (FE) (a small globular mass):

Sheets having a thickness of 0.3 mm are continuously produced for 6 hours by continuously extrusion-molding a polymer composition at an extrusion temperature of 235° C. using a 40 mm sheet extruder (i.e., an extruder for producing sheets, which has a screw having diameter of 40 mm). With respect to each of the sheets produced at points in time of 5 minutes and 6 hours after the start of the continuous molding, the number of FE's having a size of 0.5 mm or more observed per 300 cm² of the sheet is counted. Based on the difference in the number of FE's between the two sheets, the occurrence of FE's is evaluated as follows:

○: The difference is less than 50.

Δ: The difference is from 50 to 100.

X: The difference is more than 100.

Each of styrene/n-butyl acrylate copolymers A-1 to A-3, which were used in the following Examples and Comparative Examples, was produced as follows.

To a 10-liter autoclave equipped with a stirrer was added styrene and n-butyl acrylate in a weight ratio described in Table 1 (wherein the total amount of the styrene and the n-butyl acrylate was 5 kg) simultaneously with 0.3 kg of ethylbenzene and a predetermined amount of 1,1-bis(t-butylperoxy)cyclohexane (which was used for adjusting the MFR of the styrene/n-butyl acrylate copolymer to be produced). Then, a polymerization reaction was performed at 110 to 150° C. for 2 to 10 hours. From the resultant polymer were removed unreacted monomers (i.e., styrene, n-butyl acrylate and ethylbenzene) using a vented extruder to thereby obtain a styrene/n-butyl acrylate copolymer.

The properties of styrene/n-butyl acrylate copolymers A-1 to A-4 are shown in Table 1.

Blanched block copolymer B-1, which was used in the following Examples and Comparative Examples, was produced as follows.

Into a sealed 30-liter reactor having a jacket was charged a 20% by weight solution of styrene in cyclohexane, which contains 40 parts by weight of styrene. Into the reactor were charged 0.033 part by weight of n-butyllithium and 0.05 part by weight of tetrahydrofuran. The reactor was purged with nitrogen gas. A first polymerization reaction was performed at 75° C. for 25 minutes while maintaining the pressure in the reactor within the range of from 3 to 5 kg/cm²G. Then, a 20% by weight solution of styrene in cyclohexane, which contains 10 parts by weight of styrene, and 0.055 part by weight of n-butyllithium, were simultaneously charged at one time into the reactor to perform a second polymerization reaction at 75° C. for 10 minutes. Then, a 20% by weight solution of styrene in cyclohexane, which contains 20 parts by weight of styrene, and 0.088 part by weight of n-butyllithium, were simultaneously charged at one time into the reactor to perform a third polymerization reaction at 75° C. for 15 minutes. Then, a 20% by weight solution of 1,3-butadiene in cyclohexane, which contains 10 parts by weight of 1,3-butadiene, was charged at one time into the reactor to perform a fourth polymerization reaction at 75° C. for 10 minutes. Then, a fifth polymerization reaction was performed at 75° C. while continuously charging over 15 minutes into the reactor a 20% by weight cyclohexane solution of a mixture of 1,3-butadiene and styrene, which contains 10 parts by weight of 1,3-butadiene and 5 parts by weight of styrene. Then, a 20% by weight solution of 1,3-butadiene in cyclohexane, which contains 5 parts by weight of 1,3-butadiene, was charged at one time into the reactor to perform a sixth polymerization reaction at 75° C. for 5 minutes. Then, 0.46 part by weight of an epoxidized soybean oil (Vikoflex 7170) was charged into the reactor to effect a coupling reaction at 75° C. for 10 minutes. Thereafter, water was fed to the reactor in a molar amount 2.0 times the molar amount of the n-butyllithium used, and the contents of the reactor were stirred for several minutes (1 to 5 minutes), followed by addition of stabilizers. Then, the cyclohexane solvent was removed from the reactor to obtain branched block copolymer B-1 in the form of a composition thereof with stabilizers.

Further, blanched block copolymers B-2 to B-7 having block configurations shown in Table 3 were produced, wherein polymerization reactions for forming the polymer blocks were performed in the same manner as in the production of blanched block copolymer B-1.

All of the MFR's of blanched block copolymers B-1 to B-7 were measured and found to be in the range of from 5 to 13.

EXAMPLES 1 TO 5 AND COMPARATIVE EXAMPLES 1 to 6

In each of Examples 1 to 5 and Comparative Examples 1 to 6, a styrene polymer composition having a composition shown in Table 3 was subjected to extrusion molding at an extrusion temperature of 200° C. using a 40 mm sheet extruder, thereby obtaining a sheet having a thickness of 0.25 mm. The modulus in tension, elongation at break and haze of the sheet were measured in accordance with the above-mentioned methods. Further, the sheet was stretched to obtain a heat shrinkable film. With respect to the obtained heat shrinkable film, the 80° C. shrinkage factor was measured in accordance with the above-mentioned method.

Further, a sheet having a thickness of 0.6 mm was produced by substantially the same method as described ,above, and the surface impact strength and the Vicat softening point of the sheet were measured in accordance with the above-mentioned methods.

In addition, the styrene polymer composition mentioned above was subjected to continuous extrusion molding at an extrusion temperature of 235° C. using a 40 mm sheet extruder for 6 hours, thereby obtaining sheets having a thickness of 0.3 mm. With respect to the obtained sheets, FE was evaluated in accordance with the above-mentioned method.

COMPARATIVE EXAMPLE 7

A styrene/n-butyl acrylate copolymer was produced in substantially the same manner as in the production of styrene/n-butyl acrylate copolymer,A-1. The produced styrene/n-butyl acrylate copolymer had a styrene content of 96% by weight and exhibited a storage modulus of $2.3 \times 10^9$ Pa as measured at 30° C., wherein the temperature at which the styrene/n-butyl acrylate copolymer exhibits a 50% storage modulus relative to the storage modulus at 30° C. was 104° C.

Then, 50 parts by weight of the styrene/n-butyl acrylate copolymer produced above and 50 parts by weight of the branched block copolymer B-1 were fed to a 40 mm sheet extruder and extrusion-molded in substantially the same manner as in Example 1, thereby obtaining a styrene polymer composition in the form of a sheet. The sheet was stretched to obtain a heat shrinkable film. With respect to the obtained heat shrinkable film, the 80° C. shrinkage factor was measured in accordance with the above-mentioned method and found to be as low as 13%.

EXAMPLE 6

Branched block copolymer B-1 was subjected to hydrogenation in the presence of a Ti-containing hydrogenation catalyst described in Examined Japanese Patent Application Publication No. 63-5401, to thereby hydrogenate a part of the aliphatic double bonds of the 1,3-butadiene monomer units in branched block copolymer B-1, thereby obtaining hydrogenated, branched block copolymer C-1. With respect to the obtained copolymer C-1, the degree of hydrogenation of the aliphatic double bonds was 12% by weight.

Using a styrene polymer composition containing the obtained hydrogenated, branched block copolymer C-1 and having a composition shown in Table 4, sheets and a heat shrinkable film were produced in substantially the same manner as in Example 1. With respect to the obtained sheets and heat shrinkable film, various properties were measured and evaluated. The results are shown in Table 4.

EXAMPLE 7

Branched block copolymer B-3 was subjected to hydrogenation in the presence of a Ti-containing hydrogenation catalyst described in Examined Japanese Patent Application Publication No. 63-5401, to thereby hydrogenate a part of the aliphatic double bonds of the 1,3-butadiene monomer units in branched block copolymer B-3, thereby obtaining hydrogenated, blanched block copolymer C-3. With respect to the obtained copolymer C-3, the degree of hydrogenation of the aliphatic double bonds was 42% by weight.

Using a styrene polymer composition containing the obtained hydrogenated, branched block copolymer C-3 and having a composition shown in Table 4, sheets and a heat shrinkable film were produced in substantially the same manner as in Example 1. With respect to the obtained sheets and heat shrinkable film, various properties were measured and evaluated. The results are shown in Table 4.

EXAMPLE 8

Branched block copolymer D-1 was produced in substantially the same manner as in the production of branched block copolymer B-1, except that, instead of 1,3-butadiene, a mixture of 1,3-butadiene and isoprene was used. Branched block copolymer D-1 produced had substantially the same structure as that of branched block copolymer B-1 (shown in Table 2), except that branched block copolymer D-1 had a 1,3-butadiene/isoprene/styrene copolymer block (having a 1,3-butadiene/isoprene weight ratio of 20/5) in place of copolymer block "B/S", and had 1,3-butadiene/isoprene copolymer blocks (each having a 1,3-butadiene/isoprene weight ratio of 20/5) in place of polymer blocks "$B_1$" and "$B_2$".

Using a styrene polymer composition containing the obtained branched block copolymer D-1 and having a composition shown in Table 4, sheets and a heat shrinkable film were produced in substantially the same manner as in Example 1. With respect to the obtained sheets and heat shrinkable film, various properties were measured and evaluated. The results are shown in Table 4.

EXAMPLE 9

Branched block copolymer D-2 was produced in substantially the same manner as in the production of branched block copolymer B-2, except that, instead of 1,3-butadiene, a mixture of 1,3-butadiene and isoprene was used. Branched block copolymer D-2 produced had substantially the same structure as that of branched block copolymer B-2 (shown in Table 2), except that branched block copolymer D-2 had a 1,3-butadiene/isoprene/styrene copolymer block (having a 1,3-butadiene/isoprene weight ratio of 26/5) in place of copolymer block "B/S", and had 1,3-butadiene/isoprene copolymer blocks (each having a 1,3-butadiene/isoprene weight ratio of 26/5) in place of polymer blocks "B".

Using a styrene polymer composition containing the obtained branched block copolymer D-2 and having a composition shown in Table 4, sheets and a heat shrinkable film were produced in substantially the same manner as in Example 1. With respect to the obtained sheets and heat shrinkable film, various properties were measured and evaluated. The results are shown in Table 4.

TABLE 1

| | A-1 | A-2 | A-3 | A-4 |
|---|---|---|---|---|
| Styrene content (% by weight) | 88 | 83 | 78 | 90 |
| Storage modulus at 30° C. (Pa) | $1.85 \times 10^9$ | $1.80 \times 10^9$ | $1.70 \times 10^9$ | $1.88 \times 10^9$ |
| Temperature at which the storage modulus is 50% of the storage modulus at 30° C. (° C.) | 82 | 76 | 70 | 86 |
| MFR (g/10 min) | 3.5 | 4.0 | 4.8 | 2.8 |
| Melt viscosity (poise) | | | | |
| 180° C. | 28,000 | 18,500 | 16,800 | 32,000 |
| 190° C. | 24,500 | 15,600 | 13,800 | 27,500 |
| 200° C. | 20,200 | 12,800 | 12,000 | 22,500 |
| 210° C. | 17,700 | 11,100 | 10,200 | 19,500 |
| 220° C. | 15,500 | 10,100 | 8,400 | 17,200 |
| 230° C. | 14,700 | 9,300 | 7,500 | 16,500 |
| 240° C. | 14,200 | 9,000 | 7,120 | 16,100 |

TABLE 2

| | Styrene content (% by weight) | Styrene block ratio (% by weight) | Peak molecular weight of styrene polymer blocks | Block configuration of the blanched block copolymer *1 |
|---|---|---|---|---|
| B-1 | 75 | 97 | ①8,000<br>②16,000<br>③100,000 | $\begin{vmatrix} S_1-S_2-S_3-B_1-B/S-B_2 \\ S_2-S_3-B_1-B/S-B_2 \\ S_3-B_1-B/S-B_2 \end{vmatrix}_4 X$ |
| B-2 | 69 | 99 | ①15,000<br>②90,000 | $\begin{vmatrix} S_1-S_2-B/S-B \\ S_2-B/S-B \end{vmatrix}_4 X$ |
| B-3 | 81 | 91 | ①26,000<br>②70,000 | $\begin{vmatrix} S_1-S_2-B/S \\ S_2-B/S \end{vmatrix}_4 X$ |
| B-4 | 74 | 98 | ①8,000<br>②130,000 | $\begin{vmatrix} S_1-S_2-B/S-B_2 \\ S_2-B/S-B_2 \end{vmatrix}_4 X$ |
| B-5 | 89 | 95 | ①3,000<br>②180,000 | $\begin{vmatrix} S_1-S_2-B_1-B/S-B_2 \\ S_2-B_1-B/S-B_2 \end{vmatrix}_4 X$ |
| B-6 | 60 | 83 | ①30,000<br>②60,000 | $\begin{vmatrix} S_1-S_2-B_1-B/S-B_2 \\ S_2-B_1-B/S-B_2 \end{vmatrix}_4 X$ |
| B-7 | 76 | 97 | ①30,000 | $[S-B_1-B/S-B_2]_4 Y$ |

*1: In each of the block configuration, each of "B", "$B_1$" and "$B_2$" represents a 1,3-butadiene polymer block; "B/S" represents a 1,3-butadiene/styrene copolymer block; each of "S", "$S_1$", "$S_2$" and "$S_3$" represents a styrene polymer block; "X" represents an epoxy soyabean oil residue; and "Y" represents a silicon tetrachloride residue.

TABLE 3

| | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Composition | | | | | | | | | | | |
| Type and amount of the styrene/n-butyl acrylate copolymer (% by weight) *1 | A-2<br>45 | A-2<br>55 | A-1<br>30 | A-2<br>50 | A-1<br>50 | A-2<br>50 | A-2<br>50 | A-2<br>50 | A-3<br>60 | A-4<br>50 | A-2<br>95 |
| Type and amount of the blanched block copolymer (% by weight) *1 | B-1<br>55 | B-2<br>45 | B-3<br>70 | B-4<br>50 | B-1<br>50 | B-5<br>50 | B-6<br>50 | B-7<br>50 | B-1<br>40 | B-1<br>50 | B-1<br>5 |
| Stabilizer | | | | | | | | | | | |
| Stabilizer a (part by weight) *2 | 0.4 | 0.4 | — | 0.3 | 0.8 | 0.4 | — | 0.4 | — | — | 0.2 |
| Stabilizer b (part by weight) *2 | 0.2 | 0.3 | 0.6 | 0.1 | 0.4 | 0.2 | 0.4 | 0.2 | 0.4 | 0.4 | 0.1 |
| Stabilizer c (part by weight) *2 | 0.1 | 0.2 | 0.5 | — | — | 0.1 | 0.2 | 0.1 | 0.4 | 0.4 | — |
| Properties of the sheet and heat shrinkable film | | | | | | | | | | | |
| Modulus in tension (kgf/cm²) | | | | | | | | | | | |
| Extrusion Direction | 14,200 | 12,300 | 16,400 | 15,300 | 15,600 | 17,800 | 9,200 | 16,400 | 14,800 | 15,000 | 21,000 |
| Direction perpendicular to the extrusion derection | 10,300 | 9,900 | 13,500 | 11,600 | 11,400 | 15,500 | 7,600 | 16,000 | 11,500 | 11,200 | 20,500 |

TABLE 3-continued

| | Ex. 1 | Ex. 2 | Ex. 3 | Ex. 4 | Ex. 5 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|
| Elongation at break (%) | | | | | | | | | | | |
| Extrusion direction | 85 | 120 | 35 | 60 | 50 | 8 | 150 or more | 10 | 55 | 60 | 4 |
| Direction perpendicular to the extrusion derection | 110 | 145 | 50 | 90 | 70 | 12 | 150 or more | 14 | 80 | 85 | 5 |
| Surface impact strength (kg · cm) | 86 | 120 | 55 | 53 | 48 | 4 | 200 or more | 6 | 47 | 63 | 3 or less |
| Haze (%) | 0.5 | 0.9 | 0.4 | 0.4 | 0.7 | 0.4 | 4.6 | 0.5 | 3.9 | 1.6 | 0.3 |
| Shrinkage factor at 80° C. (%) | 48 | 56 | 42 | 46 | 42 | 45 | 58 | 44 | 62 | 40 | 58 |
| Vicat softening point (° C.) | 81 | 76 | 88 | 81 | 87 | 82 | 70 | 82 | 75 | 89 | 75 |
| FE | ○ | ○ | △ | ○ | ○ | ○ | x | ○ | x | x | ○ |

(Notes)
Stabilizer a: 2-(1-(2-hydroxy-3,5-di-t-pentylphenyl)ethyl)-4,6-di-t-pentylphenyl acrylate
Stabilizer b: n-octadecyl-3-(3,5-di-t-butyl-4-hydroxyphenyl)propionate
Stabilizer c: tris(nonylphenyl)phosphite
*1 The amounts of the styrene/n-butyl acrylate copolymer and the blanched block copolymer are indicated in terms of % by weight, based on the total weight of the styrene/n-butyl acrylate co-polymer and the blanched block copolymer.
*2 The amounts of the stabilizers are indicated in terms of parts by weight, relative to 100 parts by weight of the total amount of the styrene/n-butyl acrylate copolyer and the blanched block copolymer.

TABLE 4

| | Ex. 6 | Ex. 7 | Ex. 8 | Ex. 9 |
|---|---|---|---|---|
| Composition | | | | |
| Type and amount of the styrene/n-butyl acrylate copolymer (% by weight) *1 | A-2 40 | A-1 25 | A-2 45 | A-2 60 |
| Type and amount of the blanched block copolymer (% by weight) *1 | C-1 60 | C-3 75 | D-1 55 | D-2 40 |
| Stabilizer | | | | |
| Stabilizer a (parts by weight) *2 | 0.2 | 0.1 | 0.1 | 0.1 |
| Stabilizer b (parts by weight) *2 | 0.2 | 0.1 | 0.1 | 0.2 |
| Stabilizer c (parts by weight) *2 | 0.1 | — | 0.1 | 0.2 |
| Properties of the sheet and the heat shrinkable film | | | | |
| Modulus in tension (kgf/cm$^2$) | | | | |
| Extrusion Direction | 14,500 | 17,000 | 14,400 | 13,100 |
| Direction perpendicular to the extrusion derection | 11,300 | 14,600 | 11,100 | 10,600 |
| Elongation at break (%) | | | | |
| Extrusion Direction | 80 | 35 | 85 | 50 |
| Direction perpendicular to the extrusion derection | 110 | 45 | 105 | 65 |
| Surface impact strength (kg · cm) | 78 | 50 | 80 | 110 |
| Haze (%) | 0.7 | 0.8 | 0.4 | 0.9 |
| Shrinkage factor at 80° C. (%) | 46 | 40 | 50 | 57 |
| Vicat softening Point (° C.) | 83 | 91 | 82 | 78 |
| FE | ○ | ○ | ○ | ○ |

(Notes)
Stabilizer a: 2-(1-(2-hydroxy-3,5-di-t-pentylphenyl)ethyl)-4,6-di-t-pentylphenyl acrylate
Stabilizer b: n-octadecyl-3-(3,5-di-t-butyl-4-hydroxyphenyl)propionate
Stabilizer c: tris(nonylphenyl)phosphite
*1: The amounts of the styrene/n-butyl acrylate copolymer and the blanched block copolymer are indicated in terms of % by weight, based on the total weight of the styrene/n-butyl acrylate copolymer and the blanched block copolymer.
*2: The amounts of the stabilizers are indicated in terms of parts by weight, relative to 100 parts by weight of the total amount of the styrene/n-butyl acrylate copolymer and the blanched block copolymer.

INDUSTRIAL APPLICABILITY

A sheet or film obtained from the styrene polymer composition of the present invention not only exhibits high modulus in tension, high elongation at break, high surface impact strength, excellent heat resistance and excellent transparency, but also is free from marked occurrence of fish eyes. Further, a heat shrinkable film obtained from the styrene polymer composition not only is free from marked occurrence of fish eyes, but also exhibits excellent heat shrinkability at relatively low heating temperatures. Therefore, the styrene polymer composition of the present invention can be advantageously used for producing various shaped articles, such as a wrapping film, a film to be laminated on a foam container, and a heat shrinkable film.

What is claimed is:
1. A styrene polymer composition comprising:
    (I) a styrene/n-butyl acrylate copolymer comprising 80 to 89% by weight of styrene monomer units and 20 to 11% by weight of n-butyl acrylate monomer units; and

(II) a branched block copolymer comprising 65 to 85% by weight of vinyl aromatic hydrocarbon monomer units and 35 to 15% by weight of conjugated diene monomer units, said branched block copolymer (II) having a block configuration comprising at least one vinyl aromatic hydrocarbon polymer block and at least one polymer block selected from the group consisting of at least one conjugated diene polymer block and at least one vinyl aromatic hydrocarbon/conjugated diene copolymer block, wherein said at least one vinyl aromatic hydrocarbon polymer block of said branched block copolymer (II) exhibits, in a gel permeation chromatogram thereof, at least one peak molecular weight in the range of from 5,000 to 30,000 and at least one peak molecular weight in the range of from 50,000 to 150,000, wherein said branched block copolymer (II) has a vinyl aromatic hydrocarbon block ratio of from more than 90 to 100% by weight, wherein said vinyl aromatic hydrocarbon block ratio is defined as the percent by weight of the vinyl aromatic hydrocarbon monomer units contained in said at least one vinyl aromatic hydrocarbon polymer block, based on the total weight of vinyl aromatic hydrocarbon monomer units contained in said branched block copolymer (II), and wherein the weight ratio of said styrene/n-butyl acrylate copolymer (I) to said branched block copolymer (II) is from 10/90 to 90/10.

2. The styrene polymer composition according to claim 1, wherein said styrene/n-butyl acrylate copolymer (I) comprises 83 to 89% by weight of styrene monomer units and 17 to 11% by weight of n-butyl acrylate monomer units.

3. The styrene polymer composition according to claim 1 or 2, wherein said conjugated diene monomer units in said branched block copolymer (II) are formed from at least one conjugated diene selected from the group consisting of 1,3-butadiene and isoprene.

4. The styrene polymer composition according to claim 1 or 2, wherein the aliphatic double bonds of said conjugated diene monomer units in said branched block copolymer (II) are partially hydrogenated, wherein the degree of hydrogenation of said aliphatic double bonds is from 1 to 50%.

5. The styrene polymer composition according to claim 1 or 2, wherein said styrene/n-butyl acrylate copolymer (I) exhibits a melt viscosity P(T) as measured at a temperature in the range of from 180 to 240° C., which satisfies the following relationship:

$$1.46 \times 10^5 - 1119.2 \times T + 2.256 \times T^2 \le$$
$$P(T) \le 2.91 \times 10^5 - 2350 \times T + 5 \times T^2$$

wherein T represents the measuring temperature (° C.) for the melt viscosity and P(T) represents the melt viscosity (poises) of said copolymer (I) as measured at temperature T (° C.).

6. The styrene polymer composition according to claim 1 or 2, wherein said styrene/n-butyl acrylate copolymer (I) exhibits a storage modulus in the range of from $1.5 \times 10^9$ to $2.5 \times 10^9$ Pa as measured at 30° C., and wherein the temperature at which said copolymer (I) exhibits a 50% storage modulus relative to the storage modulas at 30° C. is in the range of from 75 to 100° C.

7. The styrene polymer composition according to claim 1 or 2, which further comprises, as a stabilizer, 0.05 to 3 parts by weight of 2-(1-(2-hydroxy-3,5-di-t-pentylphenyl)ethyl)-4,6-di-t-pentylphenyl acrylate, relative to 100 parts by weight of the total of said styrene/n-butyl acrylate copolymer (I) and said branched block copolymer (II).

* * * * *